(12) United States Patent
Harris

(10) Patent No.: US 8,543,377 B2
(45) Date of Patent: Sep. 24, 2013

(54) USING LINGUISTICALLY-AWARE VARIABLES IN COMPUTER-GENERATED TEXT

(75) Inventor: Peter J. Harris, Edmonton (CA)

(73) Assignee: Intuit Inc., Mountain View, CA (US)

( * ) Notice: Subject to any disclaimer, the term of this patent is extended or adjusted under 35 U.S.C. 154(b) by 666 days.

(21) Appl. No.: 12/845,997

(22) Filed: Jul. 29, 2010

(65) Prior Publication Data
US 2012/0029919 A1 Feb. 2, 2012

(51) Int. Cl.
*G06F 17/20* (2006.01)

(52) U.S. Cl.
USPC ............ 704/8; 704/9; 704/257; 704/251

(58) Field of Classification Search
USPC .......... 704/1–10, 251, 255, 257, 270, 277
See application file for complete search history.

(56) References Cited

U.S. PATENT DOCUMENTS

| | | | |
|---|---|---|---|
| 7,475,344 B1 | 1/2009 | Patil | |
| 7,788,085 B2 * | 8/2010 | Brun et al. | 704/9 |
| 2006/0100858 A1 | 5/2006 | McEntee | |
| 2006/0136352 A1 | 6/2006 | Brun | |
| 2010/0009321 A1 | 1/2010 | Purushotma | |

OTHER PUBLICATIONS

Dunne, Keiran J., "Prespectives on Localization", pp. 142-144, Ch. 3, "Localizing MMORPG's" by Eric Heimburg, 2006.

* cited by examiner

*Primary Examiner* — Huyen X. Vo
(74) *Attorney, Agent, or Firm* — Park, Vaughan, Fleming & Dowler, LLP

(57) ABSTRACT

One embodiment of the present invention provides a system for placing linguistically-aware variables in computer-generated text. During operation, the system receives a sentence at a computer system, wherein the sentence comprises two or more words. Next, the system analyzes the sentence to identify a first variable, wherein the first variable is a place-holder for a first word. The system then receives the first word. After that, the system automatically determines a gender of the first word. Next, the system analyzes the sentence to identify a first dependent word that is dependent on the first word, wherein a spelling of the first dependent word is dependent on the gender of the first word. The system then determines the spelling of the first dependent word that corresponds to the gender of the first word. Next, the system replaces the first variable in the sentence with the first word. If necessary, the system modifies the spelling of the first dependent word in the sentence to match the gender of the first word. Finally, the system outputs the sentence.

20 Claims, 3 Drawing Sheets

USING LINGUISTICALLY-AWARE VARIABLES IN COMPUTER-GENERATED TEXT

BACKGROUND

Related Art

In Romance languages (those derived from Latin, i.e., French, Spanish, Italian, etc.) nouns have a property called "gender." Moreover, gender affects the spelling of other words in a sentence that are associated with these nouns. These other words have to "agree" with the gender of the nouns. This means that dropping an arbitrary noun into a sentence without consideration of the noun's gender will not work in the romance languages as it does in English.

When writing computer programs that generate text in languages with gender-based nouns, programmers sometimes include indicators in pre-programmed sentences to indicate which words in the sentences need to be modified depending on which nouns end up in the sentence. While this works well in cases where the gender of the nouns is known, it is still problematic when the nouns originate from user-supplied data and are consequently not known ahead of time. In these instances, the programmer does not know ahead of time what the gender of the nouns will be, and the users cannot be relied upon to supply the gender.

SUMMARY

One embodiment of the present invention provides a system for placing linguistically-aware variables in computer-generated text. During operation, the system receives a sentence at a computer system, wherein the sentence comprises two or more words. Next, the system analyzes the sentence to identify a first variable, wherein the first variable is a placeholder for a first word. The system then receives the first word. After that, the system automatically determines a gender of the first word. Next, the system analyzes the sentence to identify a first dependent word that is dependent on the first word, wherein a spelling of the first dependent word is dependent on the gender of the first word. The system then determines the spelling of the first dependent word that corresponds to the gender of the first word. Next, the system replaces the first variable in the sentence with the first word. If necessary, the system modifies the spelling of the first dependent word in the sentence to match the gender of the first word. Finally, the system outputs the sentence.

In some embodiments of the present invention, the system automatically determines the gender of the first word by determining a spelling of the first word and by analyzing the spelling of the first word using a pre-determined list of rules to determine the gender.

In some embodiments of the present invention, receiving the first word additionally includes receiving a grammatical article for the first word.

In some embodiments of the present invention, automatically determining the gender of the first word involves analyzing the article.

In some embodiments of the present invention, automatically determining the gender of the first word involves performing a lookup in a dictionary.

In some embodiments of the present invention, the system analyzes the sentence to identify a grammatical article that is associated with the first word. Finally, the system modifies a spelling of the grammatical article to match the gender of the first word.

In some embodiments of the present invention, a language of the sentence can include: French, German, Spanish, Italian, Polish, Russian, Hindi, Hebrew, and any other languages that support grammatical genders.

Figure 1:
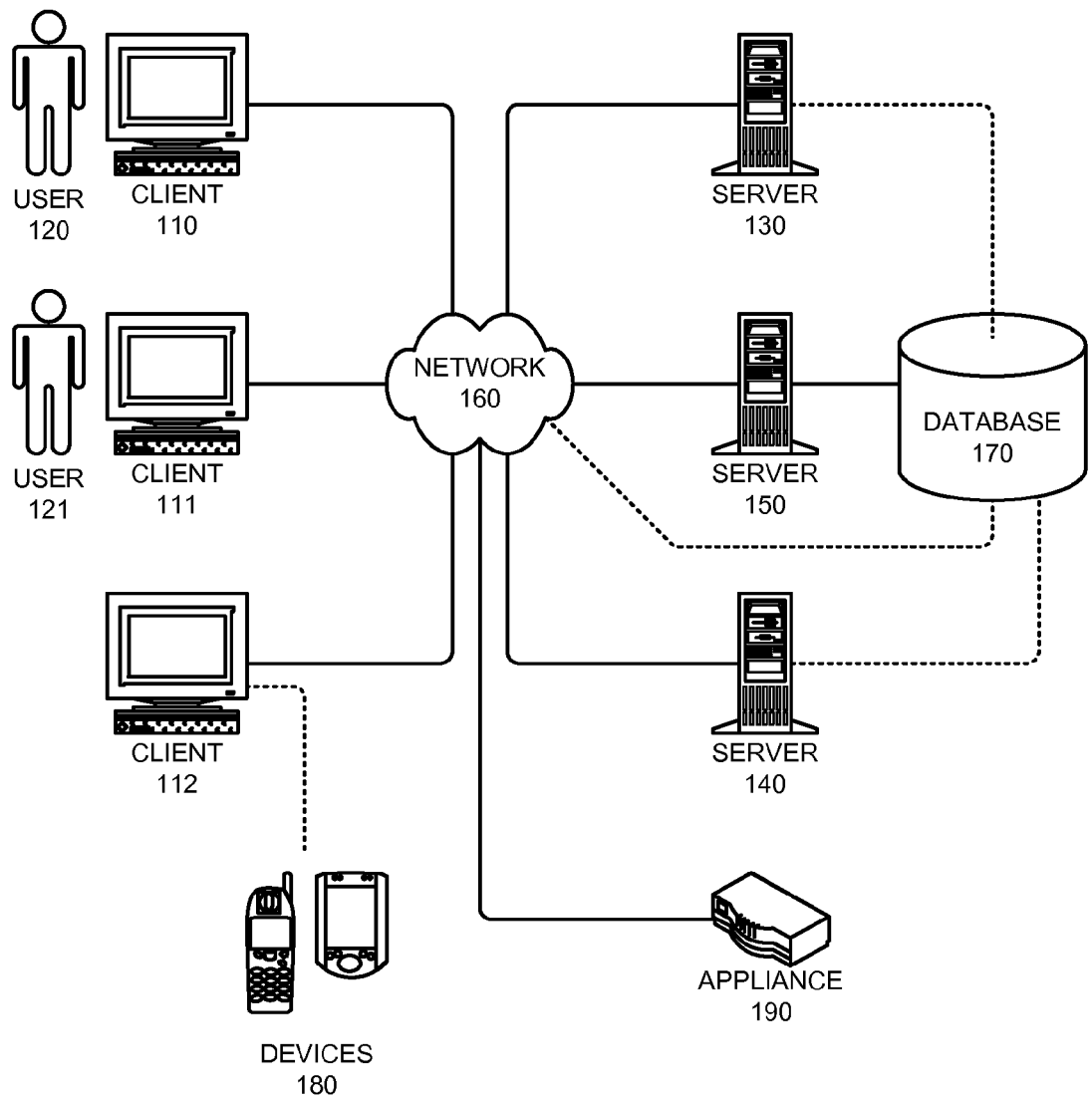
FIG. 1 illustrates a computing environment in accordance with an embodiment of the present invention.

TABLE 1 presents an exemplary function to determine gender in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

OVERVIEW

One embodiment of the present invention provides a system for placing linguistically-aware variables in computer-generated text. During operation, the system receives a sentence at a computer system, wherein the sentence comprises two or more words. Next, the system analyzes the sentence to identify a first variable, wherein the first variable is a placeholder for a first word. The system then receives the first word. Note that the first word can come from virtually any source, such as a database, an online service, input from a user, etc.

Next, the system automatically determines a gender of the first word. After that, the system analyzes the sentence to identify a first dependent word that is dependent on the first word, wherein a spelling of the first dependent word is dependent on the gender of the first word. The system then determines the spelling of the first dependent word that corresponds to the gender of the first word. Next, the system replaces the first variable in the sentence with the first word. If necessary, the system modifies the spelling of the first dependent word in the sentence to match the gender of the first word.

For example, if the first dependent word is spelled to agree with a noun with male gender, and a noun with female gender is inserted into the sentence, the spelling of the first dependent word needs to change to agree with the female form of the noun.

Finally, the system outputs the sentence. Note that this can include any normal means of output for a computer system, including printing, faxing, emailing, texting, sending to a display, etc.

In some embodiments of the present invention, the system the first word and by analyzing the spelling of the first word using a pre-determined list of rules to determine the gender. In many languages, one can determine the gender of a vast majority of nouns simply by analyzing their spelling. For example, in French, the phrase "la date sélectionnée" means "the selected date," and the phrase "le prix sélectionné" means "the selected price." In this example, the noun "date" is feminine and the noun "prix" is masculine.

The gender of these two nouns can be determined by analyzing their endings. Nouns ending in "te" are typically feminine while the majority of nouns not ending in a mute "e" are masculine. Note that there are plenty of notable exceptions to this rule, but many of those exceptions can be caught with more rules.

In this example, notice how the spelling of the dependent word "sélectionné" changes to agree with the gender of the noun that it is paired with. "Sélectionné" is the masculine form that agrees with the masculine noun "prix," while "sélectionnée" is the feminine form that agrees with the feminine noun "date." Also notice that the spelling of the article ("le" for the masculine, "la" for the feminine) changes as well to agree with the gender.

In some embodiments of the present invention, receiving the first word additionally includes receiving a grammatical article for the first word. In French, there are a number of nouns that can mean two entirely different things depending on their gender. These nouns should always be supplied with an article, otherwise it is nearly impossible without context to determine their gender. For example, the noun "voile" can mean two entirely different things depending on the gender. The masculine form "la voile" means the sail on a boat, while "le voile" is a veil. Without the grammatical article "la" or "le," it is impossible to determine the meaning of "voile" without context. Note that even with some context, such as the knowledge that the noun comes from an invoice of a textile business, it can still remain unclear which noun is intended.

In some embodiments of the present invention, automatically determining the gender of the first word involves analyzing the article. As with the case of "voile," the best way to determine the gender of a noun is to analyze the spelling of the article if it was supplied with the noun.

In some embodiments of the present invention, automatically determining the gender of the first word involves performing a lookup in a dictionary. For example, with the numerous exceptions to the various rules, in one embodiment of the present invention, the system could first check a dictionary of exceptions to determine the gender of a noun. If the noun in question does not exist in the dictionary, the system could then apply the rules to determine the gender.

In some embodiments of the present invention, the system analyzes the sentence to identify a grammatical article that is associated with the first word. Finally, the system modifies a spelling of the grammatical article to match the gender of the first word. For example, the pre-determined sentence might include the article "le" as a placeholder before the first word. If the first word turns out to be feminine, the system would then modify the spelling of the article "le" to "la" to agree with the feminine gender of the first word.

In some embodiments of the present invention, a language of the sentence can include: French, Spanish, Italian, Polish, Russian, Hindi, Hebrew, and any other languages that support grammatical genders. Note that, while examples herein are described in French, embodiments of the present invention are not meant to be limited to French.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
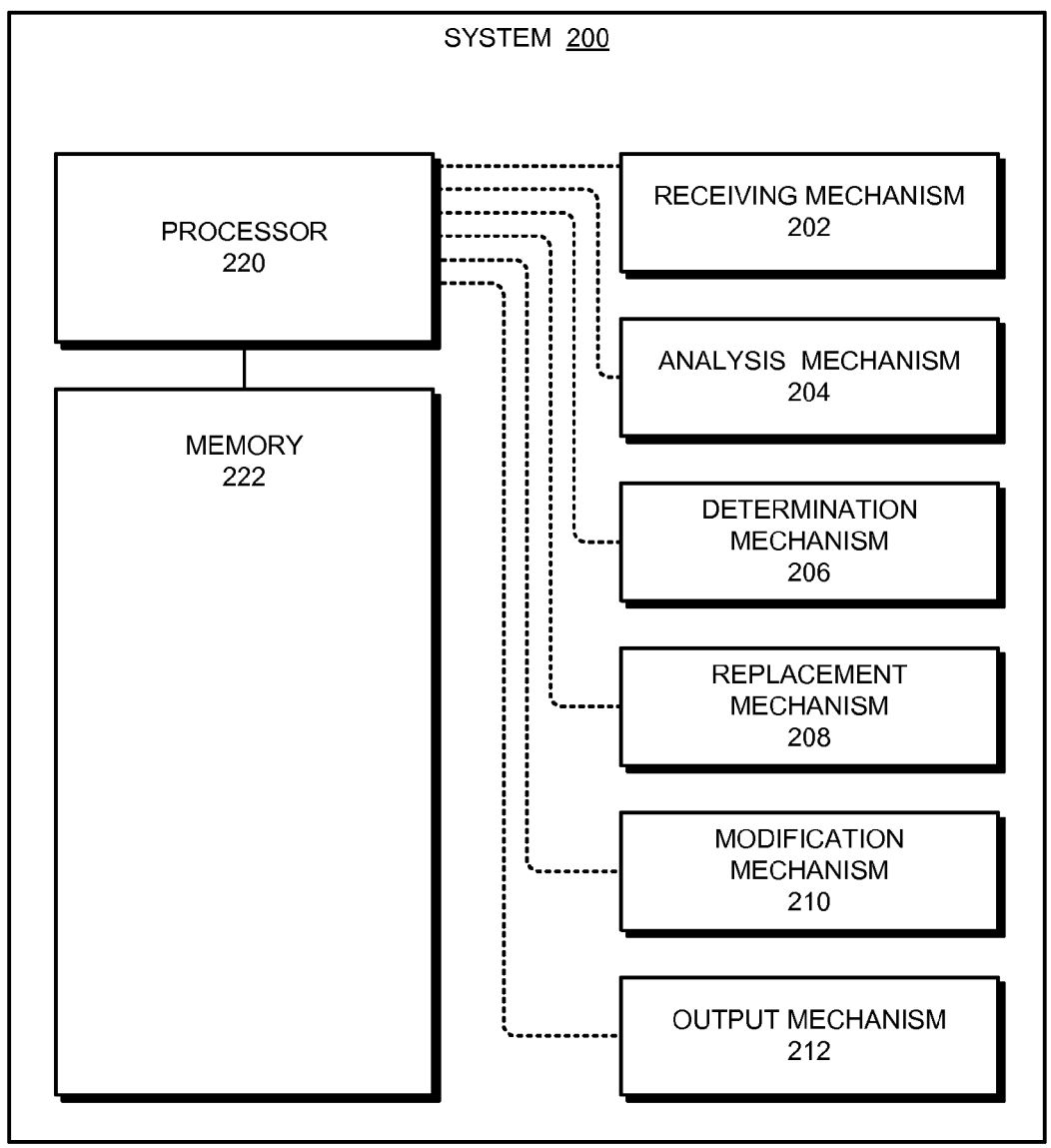
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, analysis mechanism 204, determination mechanism 206, replacement mechanism 208, modification mechanism 210, output mechanism 212, processor 220, and memory 222.

Placing Linguistically-Aware Variables in Computer-Generated Text

Figure 3:
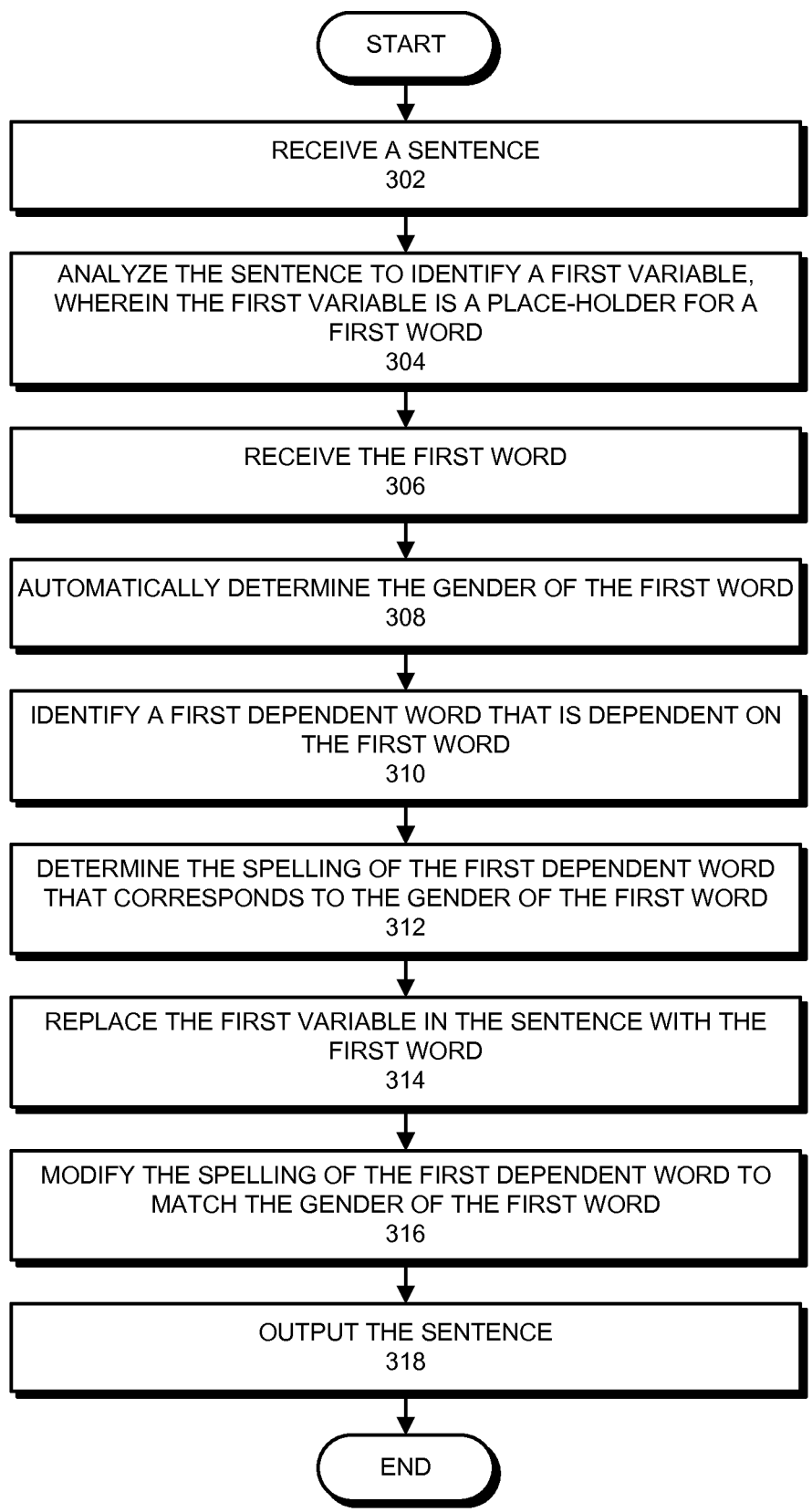
FIG. 3 presents a flow chart illustrating the process of placing linguistically-aware variables in computer-generated text in accordance with an embodiment of the present invention.

FIG. 3 presents a flow chart illustrating the process of placing linguistically-aware variables in computer-generated text in accordance with an embodiment of the present invention. During operation, receiving mechanism 202 receives a sentence at system 200 (operation 302). Note that the sentence comprises two or more words. Next, analysis mechanism 204 analyzes the sentence to identify a first variable (operation 304), wherein the first variable is a place-holder for a first word. Receiving mechanism 202 then receives the first word (operation 306). Note that, as described previously, the first word can be received from a variety of sources, including databases, services, input from a user, financial data, a third party, etc.

Once the first word has been received, determination mechanism 206 automatically determines a gender of the first word (operation 308). Note that this can be accomplished in a number of ways, including applying a list of rules, performing a lookup in a dictionary, analyzing a grammatical article supplied with the first word, etc.

Next, analysis mechanism 204 analyzes the sentence to identify a first dependent word that is dependent on the first word (operation 310), wherein a spelling of the first dependent word is dependent on the gender of the first word. Determination mechanism 206 then determines the spelling of the first dependent word that corresponds to the gender of the first word (operation 312). Additionally, replacement mechanism 208 replaces the first variable in the sentence with the first word (operation 314).

If necessary, modification mechanism 210 modifies the spelling of the first dependent word in the sentence to match the gender of the first word (operation 316). Finally, output mechanism 212 outputs the sentence in a pre-determined manner (operation 318). Note that this can include any normal means of output for a computer system, including printing, faxing, emailing, texting, sending to a display, etc.

Functional Example

Consider the following programmatic sentence:

L'{$item|1} {1|sélectionné} dans l'{$doc|2} {2|mémorisé} a été {1|enregistré}.

This exemplary sentence comprises two variables that will be populated with nouns, "$item" and "$doc." These variables are also identified by numbers in order to tie these variables to their dependent words. For example, variable word "{$item|1}" is associated with dependent words "{1|sélectionné}" and "{1|enregistré}," and variable word "{$doc|2}" is associated with dependent word "{2|mémorisé}." Additionally, note that both variable words "$item" and "$doc" are preceded by the article "l'." The article attached to a variable word must also be given gender consideration when the variable is replaced with a noun.

In this example, when the masculine noun "prix" is inserted into variable $item and the feminine noun "operation" is inserted into variable $doc, the resultant sentence becomes: "Le prix sélectionné dans l'operation mémorisée a été enregistré." However, when the feminine noun "date" is inserted into variable $item and the masculine noun "montant facture" is inserted into variable $doc, the resultant sentence becomes: "La date sélectionnée dans le montant facturé mémorisé a été enregistrée." Thus, changing two nouns in the sentence results in the modification of five additional words in the sentence.

Exemplary Function to Determine Gender

TABLE 1 presents an exemplary function to determine gender in accordance with an embodiment of the present invention.

TABLE 1

```
function frenchGender( noun ) {
    // Expect all nouns to be masculine by default.
    var gender = "M";
    // Strip out any existing articles, and use those to determine gender
    if ( noun.match(/^\s*(le|un|ce|du)\s+/i) ) {
        gender = "M";
        noun = noun.replace(/^\s*(le|un|ce|du)\s+/i, "");
    } else if ( noun.match(/^\s*(la|une|cette|de\s+la)\s+/i) ) {
        gender = "F";
        noun = noun.replace(/^\s*(la|une|cette|de\s+la)\s+/i, "");
    } else {
        noun = noun.replace(/^\s*(le|la|l'|l'|les|un|une|ce|cette|du|de\s+la|d'|d')\s+/i, "");
        // In the case of compound words ("montant facturé", for example) the first word typically controls. Strip down to just the first word for rules.
        noun = noun.replace(/\s+.*$/, "");
        // The Sacred Gender Rule I: except when they end in a mute "e".
        if ( noun.match(/e$/i) ) {
            gender = "F";
            // The Sacred Gender Rule II: except for -ge, -le (but not -ole, -ale, -ule, -lle), -me, -re (but not -ure), -cide
            if ( noun.match(/ge$|[^oaul]le$|me$|[^u]re$|cide$/i) ) {
                gender = "M";
                // Sacred Gender Rule II: Explicit exceptions
```

TABLE 1-continued

```
to -ge endings
                if (
noun.match(/^(cage|plage|rage|image|Norvège|allonge|auberge|barge
|charge|éponge|horloge|jauge|luge|neige|orge|phalange|purge|louange)
$/i)) { gender = "F"; }
                // Sacred Gender Rule II: Explicit exceptions
to -me endings
                if (
noun.match(/^(alarme|âme|arme|bohème|borne|cime|coutume|crème|
écume|énigme|épigramme|escrime|estime|ferme|firme|flamme|forme|
gomme|larme|plume|rame|rime|trirème)$/i) ) { gender = "F"; }
                // Sacred Gender Rule II: Explicit exceptions
to -le endings
                if (
noun.match(/^(aile|étable|fable|île|jungle|poêle|table)$/i) ) {
gender = "F"; }
                // Sacred Gender Rule II: Explicit exceptions
to -re endings
                if (
noun.match(/^(affaire|ancre|chambre|chaire|grammaire|guerre|
molaire|paire|pierre|rencontre|terre)$/i) ) { gender = "F"; }
                // Sacred Gender Rule II: Explicit exceptions
to -ère endings
                if (
noun.match(/^(bière|bruyère|ère|galère|misère|prière|sphère)$/i) ) {
gender = "F"; }
                // Sacred Gender Rule II: Explicit exceptions
to -oire endings
                if (
noun.match(/^(armoire|baignoire|foire|gloire|histoire|mâchoire|trajec
toire|victoire)$/i) ) { gender = "F"; }
            } else {
                // Sacred Gender Rule I: Explicit exceptions
to mute "e" (feminine) endings, -ée, -ie, -ue, -be, -ce
                if (
noun.match(/^(apogée|musée|trophée|génie|incendie|parapluie|foie|
microbe|tube|cube|verbe|globe|pouce|commerce|divorce|silence)$/i) ) {
gender = "M"; }
                // Sacred Gender Rule I: Explicit exceptions
to mute "e" (feminine) endings, -de, fe, lle
                if (
noun.match(/^(stade|acide|monde|interlude|coude|prélude|episode|exode
|dioxyde|oxyde|iode|fluide|solide|lipide|golfe|vermicelle|intervalle)
$/i) ) { gender = "M"; }
                // Sacred Gender Rule I: Explicit exceptions
to mute "e" (feminine) endings, -ole, -ale, -ule
                if (
noun.match(/^(châle|scandale|pétale|monopole|contrôle|rôle|symbole|pr
éambule|tentacule|testicule|ventricule)$/i) ) { gender = "M"; }
                // Sacred Gender Rule I: Explicit exceptions
to mute "e" (feminine) endings, -gue, -que
                if (
noun.match(/^(diaologue|monologue|catalogue|moustique|élastique|
Mexique|astérique|cirque|disque|risque|phoque|kiosque|casque|chèque|
classique)$/i) ) { gender = "M"; }
                // Sacred Gender Rule I: Explicit exceptions
to mute "e" (feminine) endings, -ne but not gasses (...gène) or
...phone words
                // TODO: is "...gène" only ever going to be
gasses? Check; possibly dubious logic here.
                if ( noun.match(/gène$|phone/i) ) { gender =
"M"; }
                if (
noun.match(/^(magazine|champagne|règne|peigne|insigne|cygne|
gène))$/i) ) { gender = "M"; }
                // Sacred Gender Rule I: Explicit exceptions
to mute "e" (feminine) endings, -pe, -ure, -se
                    if ( noun.match(/ope$/i) ) { gender = "M"; }
                if (
noun.match(/^(groupe|type|murmure|malaise)$/i) ) { gender = "M"; }
                // Sacred Gender Rule I: Explicit exceptions
to mute "e" (feminine) endings, -te
                if (
noun.match(/^(coyote|zygote|antidote|vote|conte|doute|compte|
parachute|tumulte|culte|geste|inceste|insecte|manifeste|nitrate|
azote|carbonate|sulfate|squelette)$/i) ) { gender = "M"; }
                // Sacred Gender Rule I: Explicit exceptions
to mute "e" (feminine) endings, -ve
                    if ( noun.match(/^(fleuve|rêve)$/i) ) )
gender = "M"; }
            }
        } else {
            // The Sacred Gender Rule II: except -on, -é, and -
eur are typically feminine also
                if ( noun.match(/on$|é$|eur$/i) ) {
                    gender = "F";
                // Sacred Gender Rule II: Explicit exceptions
to non-mute-"e" (feminine) endings, -on
                if (
noun.match(/^(avoin|camion|crayon|flocon|jambon|savon|ballon|veston|
carton|billion|ion|million)$/i) ) { gender = "M"; }
                // Sacred Gender Rule II: Explicit exceptions
to non-mute-"e" (feminine) endings, -é, eur
                if (
noun.match(/^(comité|côté|été|bonheur|équateur|extérieur|facteur|honn
eur|labeur|intérieur|malheur|secteur|aspirateur|ordinateur|congélateu
r|exportateur|ingénieur|menteur|rupteur|réflecteur|projecteur)$/i) )
{ gender = "M"; }
                } else {
                    // Sacred Gender Rule I: Explicit exceptions
to consonant endings
                if (
noun.match(/^(soif|faim|fin|main|jeep|cuiller|plupart|star|mer|fois|o
asis|vis|dent|nuit|forêt|jument|croix|paix|noix|toux|voix)$/i) ) {
gender = "F";
                // Sacred Gender Rule I: Explicit exceptions
to vowel endings
                    if (
noun.match(/^(villa|polka|samba|salsa|pizza|vodka|influenza|malaria|
paranoia|caféteria|saga|foi|loi|paroi|fourmi|dynamo|gestapo|libido|ver
tu|tribu|eau|peau)$/i) ) { gender = "F"; }
                }
            }
            // Words that can be both genders and are spelled the
same regardless (but change meanings)
            // -- if we've gotten this far there's no article prefix
embedded to give it away, we have no info.
            if (
noun.match(/(^livre$|^manche$|^merci$|^moule$|^tour$|^vase$|^voile$|
^memoire$)/i) ) {
                gender = "";
            }
        }
        return gender;
    }
```

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for using linguistically-aware variables in computer-generated text, the method comprising:
    receiving a sentence at a computer system, wherein the sentence comprises two or more words;
    analyzing the sentence to identify a first variable, wherein the first variable is a place-holder for a first word;
    receiving the first word;
    automatically determining a gender of the first word;
    analyzing, by a computer, the sentence to identify a first dependent word that is dependent on the first word, wherein a spelling of the first dependent word is dependent on the gender of the first word;
    replacing the first variable in the sentence with the first word;
    determining the spelling of the first dependent word that corresponds to the gender of the first word, and if necessary, modifying the spelling of the first dependent word in the sentence to match the gender of the first word; and outputting the sentence.

2. The computer-implemented method of claim 1, wherein automatically determining the gender of the first word involves:
   determining a spelling of the first word; and
   analyzing the spelling of the first word using a pre-determined list of rules to determine the gender.

3. The computer-implemented method of claim 1, wherein receiving the first word additionally includes receiving a grammatical article for the first word.

4. The computer-implemented method of claim 3, wherein automatically determining the gender of the first word involves analyzing the grammatical article.

5. The computer-implemented method of claim 1, wherein automatically determining the gender of the first word involves performing a lookup in a dictionary.

6. The computer-implemented method of claim 1, further comprising:
   analyzing the sentence to identify a grammatical article that is associated with the first word; and
   modifying a spelling of the grammatical article to match the gender of the first word.

7. The computer-implemented method of claim 1, wherein a language of the sentence can include:
   French;
   Spanish;
   Italian;
   Polish;
   Russian;
   Hindi;
   Hebrew; and
   any other languages that support grammatical genders.

8. A non-transitory computer-readable storage medium storing instructions that when executed by a computer cause the computer to perform a method for using linguistically-aware variables in computer-generated text, the method comprising:
   receiving a sentence at a computer system, wherein the sentence comprises two or more words;
   analyzing the sentence to identify a first variable, wherein the first variable is a place-holder for a first word;
   receiving the first word;
   automatically determining a gender of the first word;
   analyzing the sentence to identify a first dependent word that is dependent on the first word, wherein a spelling of the first dependent word is dependent on the gender of the first word;
   replacing the first variable in the sentence with the first word;
   determining the spelling of the first dependent word that corresponds to the gender of the first word, and if necessary, modifying the spelling of the first dependent word in the sentence to match the gender of the first word; and
   outputting the sentence.

9. The non-transitory computer-readable storage medium of claim 8, wherein automatically determining the gender of the first word involves:
   determining a spelling of the first word; and
   analyzing the spelling of the first word using a pre-determined list of rules to determine the gender.

10. The non-transitory computer-readable storage medium of claim 8, wherein receiving the first word additionally includes receiving a grammatical article for the first word.

11. The non-transitory computer-readable storage medium of claim 10, wherein automatically determining the gender of the first word involves analyzing the grammatical article.

12. The non-transitory computer-readable storage medium of claim 8, wherein automatically determining the gender of the first word involves performing a lookup in a dictionary.

13. The non-transitory computer-readable storage medium of claim 8, wherein the method further comprises:
   analyzing the sentence to identify a grammatical article that is associated with the first word; and
   modifying a spelling of the grammatical article to match the gender of the first word.

14. The non-transitory computer-readable storage medium of claim 8, wherein a language of the sentence can include:
   French;
   Spanish;
   Italian;
   Polish;
   Russian;
   Hindi;
   Hebrew; and
   any other languages that support grammatical genders.

15. An apparatus configured to use linguistically-aware variables in computer-generated text, comprising:
   a memory;
   a processor;
   a receiving mechanism configured to receive a sentence at a computer system, wherein the sentence comprises two or more words;
   an analysis mechanism configured to analyze the sentence to identify a first variable, wherein the first variable is a place-holder for a first word;
   wherein the receiving mechanism is further configured to receive the first word;
   a determination mechanism configured to automatically determine a gender of the first word;
   wherein the analysis mechanism is further configured to analyze the sentence to identify a first dependent word that is dependent on the first word, wherein a spelling of the first dependent word is dependent on the gender of the first word;
   a replacement mechanism configured to replace the first variable in the sentence with the first word;
   wherein the determination mechanism is further configured to determine the spelling of the first dependent word that corresponds to the gender of the first word;
   a modification mechanism configured to modify the spelling of the first dependent word in the sentence to match the gender of the first word if necessary; and
   an output mechanism configured to output the sentence.

16. The apparatus of claim 15, wherein the determination mechanism automatically determines the gender of the first word by:
   determining a spelling of the first word; and
   analyzing the spelling of the first word using a pre-determined list of rules to determine the gender.

17. The apparatus of claim 15, wherein the receiving mechanism additionally receives a grammatical article for the first word.

18. The apparatus of claim 17, wherein the determination mechanism automatically determines the gender of the first word by analyzing the grammatical article.

19. The apparatus of claim 15, wherein the determination mechanism automatically determines the gender of the first word by performing a lookup in a dictionary.

20. The apparatus of claim 15:
wherein the analysis mechanism is further configured to analyze the sentence to identify a grammatical article that is associated with the first word; and
wherein the modification mechanism is further configured to modify a spelling of the grammatical article to match the gender of the first word.

\* \* \* \* \*